Sept. 6, 1949.   J. R. BROWN   2,481,074
LAWN SPRINKLER
Filed Feb. 11, 1946
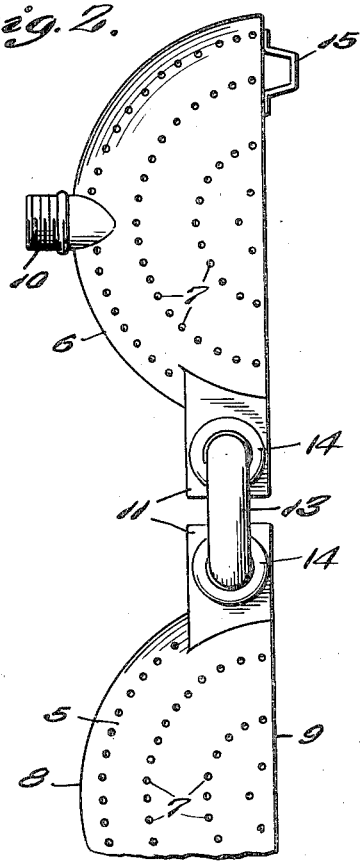
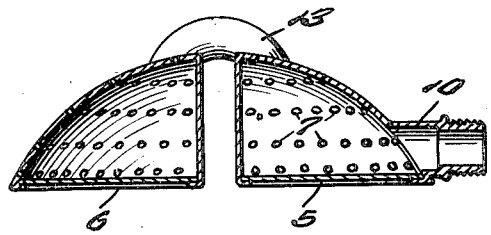
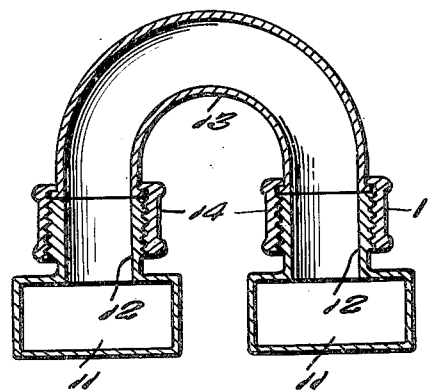
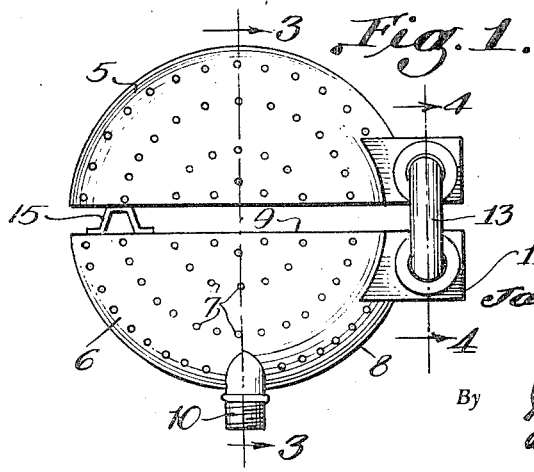
Inventor
James R. Brown
By Clarence A. O'Brien
and Harvey B. Jacobson
Attorneys

UNITED STATES PATENT OFFICE 2,481,074

LAWN SPRINKLER

James R. Brown, Houston, Tex.

Application February 11, 1946, Serial No. 646,867

2 Claims. (Cl. 299—141)

The present invention relates to new useful improvements in lawn sprinklers, and has for its primary object to provide means for controlling to a limited extent the area of the lawn within the range of the sprinkler.

More specifically the invention embodies the provision of a pair of semi-circular spray heads pivotally connected to each other whereby the spray heads may be moved with their flat sides in alined position to direct the spray at the side of the head away from their flat sides, or to move the spray heads with their flat sides opposed to provide a circular spray pattern.

An important object of the present invention is to provide a hinged connection for the spray head which also provides a passage for water from one spray head to the other.

The advantage of a sprinkler of this type over common type sprinklers is that when the pair of spray heads are moved into an open position all of the water will be thrown in the same direction, thus permitting watering close to walks, driveways, streets and the like without the water being wasted by being thrown onto the walks, driveways or the like.

A further object of this invention is to provide a device of this character of simple and practical construction, which is efficient and reliable in use, and relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view showing the area of spray heads in closed position to spray the water in a circular pattern;

Figure 2 is a top plan view showing the spray head in an open position and partly broken away;

Figure 3 is a transverse sectional view taken on a line 3—3 of Figure 1;

Figure 4 is an enlarged sectional view of the pivotal connection between the spray heads, taken on the line 4—4 of Figure 1.

Referring now to the drawings in detail wherein for the purpose of illustration I have disclosed a preferred embodiment of the invention, the numerals 5 and 6 designate a pair of spray heads of hollow construction and of substantially semicircular shape, the upper surface of the spray heads being rounded and formed with circular rows of orifices or spray openings 7.

One edge of each of the spray heads is rounded as shown at 8 while its opposite edge is straight as shown at 9.

A nipple 10 is connected to one of the rounded edges 8 of the spray head 6 and to which a hose may be attached for supplying water to the spray heads.

At one end of the flat side 9 of each of the spray heads is an outwardly projecting chamber 11 communicating with the interior of the spray heads, each of the chambers 11 being formed with an upstanding threaded nipple 12 to which one end of an inverted U-shaped fitting 13 is connected by means of a nut 14. The connector 13 provides a passage for water from the spray head 6 to the spray head 5 and the connector 13 and nut 14 also provide means by which the spray heads may be swung from their closed position as shown in Figure 1 of the drawings with the straight edges 9 thereof in opposed relation into an open position as shown in Figure 5 of the drawings with the straight edges 9 of the spray heads in alinement.

Accordingly, when it is desired to spray the water in a circular pattern, the spray heads 5 and 6 are moved into their closed position as shown in Figure 1, and when it is desired to spray the water in a pair of semi-circular patterns the spray heads are moved into their open position as shown in Figure 5 whereby the area at the flat edges 9 of the spray heads will not be supplied with water and all of the water will be sprayed outwardly from the rounded edges 8 of the pair of spray heads.

The flat edge 9 of the spray head 6 is provided with a stop 15 which projects rearwardly therefrom and which forms an abutment for the straight edge of the spray head 5 to maintain the straight edges of the two spray heads in parallelism when in their closed position to provide a true circular pattern of the water.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

I claim:

1. A lawn sprinkler comprising a pair of semicircular spray heads, one of said heads having a hose connection, a chamber projecting outwardly from one end of each head and communicating therewith, and an inverted U-shaped connector pivotally connected at its ends to said chambers for independent swinging movement of the heads in a common plane, said connector providing a passage between the chambers.

2. A lawn sprinkler comprising a pair of semicircular spray heads, one of said heads having a hose connection, and both of said heads including a straight edge, a connector at one end of the heads pivotally connecting the heads for horizontal swinging movement and providing a passage between the heads, and a stop carried at the straight edge of one of the heads and engaging the straight edge of the other head to maintain said straight edges in parallelism when the heads are moved into a circular position.

JAMES R. BROWN.

REFERENCES CITED

The following references are of record in the file of this patent:

UNITED STATES PATENTS

| Number | Name | Date |
|---|---|---|
| 1,758,767 | Taggart | May 13, 1930 |
| 1,942,905 | Semkow | Jan. 9, 1934 |
| 2,124,551 | Freidman et al. | July 26, 1938 |